(12) United States Patent
Maples

(10) Patent No.: US 7,817,398 B1
(45) Date of Patent: Oct. 19, 2010

(54) SURGE ARRESTOR MOUNTING SYSTEM

(75) Inventor: David A. Maples, Manasses, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 454 days.

(21) Appl. No.: 11/940,087

(22) Filed: Nov. 14, 2007

(51) Int. Cl.
H01C 7/12 (2006.01)
H02H 1/00 (2006.01)
H02H 1/04 (2006.01)
H02H 3/22 (2006.01)
H02H 9/06 (2006.01)
H01R 12/00 (2006.01)

(52) U.S. Cl. .................. 361/118; 361/111; 439/76.1
(58) Field of Classification Search .......... 361/118, 361/111; 439/76.1
See application file for complete search history.

(56) References Cited

U.S. PATENT DOCUMENTS

| | | | |
|---|---|---|---|
| 4,504,883 A | 3/1985 | Uchida et al. | |
| 5,930,102 A | 7/1999 | Rook | |
| 5,969,932 A | 10/1999 | Ryan et al. | |
| 6,881,076 B2 * | 4/2005 | Baker | 439/76.1 |

OTHER PUBLICATIONS

Transtector.com, "Transtector Advanced Lightning Protection Unit," www.transtector.com (2005), 2 pp.
Transtector.com, "Transtector ALPU Series," www.transtector.com, 13 pp.

* cited by examiner

Primary Examiner—Jared Fureman
Assistant Examiner—Lucy Thomas

(57) ABSTRACT

A surge-protection system for vertically supporting a plurality of surge-arrestor modules is provided. Initially, the system includes the following elements: the plurality of surge-arrestor modules, which function to regulate surges between telecommunication devices; and a mounting-frame assembly inter-disposed between a wall and each of the plurality of surge-arrestor modules. The plurality of surge-arrestor modules includes a housing with sidewalls and in substantially parallel-spaced relation, and a front panel and a rear panel, wherein the panels span between the first sidewall and the second sidewall. Additionally, the surge-arrestor modules include signal port(s) integrated within the sidewalls, socket (s) integrated within the rear panel, and a circuit board internally disposed within the housing that creates a signal path between the signal port(s). The mounting-frame assembly includes grounding connector(s) that outwardly extend and are adapted to insert within the socket(s), respectively, of each surge-arrestor module thereby vertically supporting each module in frictional engagement.

18 Claims, 3 Drawing Sheets

SURGE ARRESTOR MOUNTING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates generally to field of surge protection, and more particularly to a mounting system for one or more radio frequency (RF) surge arrestor devices.

Telephone and cable lines provide a means for carrying signals (e.g., RF signal transmissions) between network components and commercial equipment. However, to support normal operation, the design of these network lines inherently allow for conduction of high voltage. Occasionally, lightning strikes, switching surges, transients, noise, incorrect connections, and other abnormal conditions generate unexpected power surges, or spikes, which can be a significantly high voltage value that is above the designated level of electric flow across the network lines. If the power surge is high, it can inflict heavy damage to, or even destroy sensitive components within, the network. Network providers have developed a variety of protective devices that function to control the electric flow across network lines by blocking or shorting the power surges to ground if they rise above a safe threshold.

In particular, surge arrestors are employed to protect telecommunication equipment used in RF signal transmission routes from sudden changes in electric flow, or from an introduction of an electrical transient. In one such application, multiple surge arrestors are provided in a common area, where each surge arrestor is designated for separate pieces of telecommunication equipment. A common mounting technique involves assembling the plurality of surge arrestors to a rack in a stackable configuration. Although configured to occupy a compact space, the present mounting designs require an involved process for installing and removing an individual surge arrestor. As such, the accessibility for repair and replacement, as well as the ability to efficiently diagnose network failures, has been severely limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the invention generally relate to a surge-arrestor module mounting system. More particularly, a first aspect of an embodiment is directed to a surge-arrestor module that includes a housing, signal input port(s), signal output port(s), socket(s), circuitry, and fastener(s). The housing includes a first sidewall and a second sidewall, where each resides in substantially parallel-spaced relation. The housing also includes a front panel and a rear panel, where the front panel and the rear panel span between the first sidewall and the second sidewall. The signal input port(s) are integrated within the first sidewall and are configured to receive a connector attached to a first signal-communication line. The signal output port(s) are integrated within the second sidewall and are configured to receive a connector attached to a second signal-communication line. The socket(s) are integrated within the rear panel, where each socket is configured to receive a grounding connector that extends from a wall-mount bracket. The circuitry is internally disposed within the housing and provides a communicative signal path between the signal input port(s) and the signal output port(s). The fastener(s) are partially captive within the housing, where the fastener(s) securably couple the surge-arrestor module to the wall-mount bracket.

In a second aspect, embodiments are directed toward a surge-arrestor module mounting assembly that vertically supports a surge-arrestor module. Initially, the assembly includes the surge-arrestor module and a mounting-frame assembly. The surge arrestor module includes the following elements: a housing, signal post(s), socket(s), and a circuit board. The housing includes a first sidewall and a second sidewall, which reside in substantially parallel-spaced relation, and a front panel and a rear panel, which span between the first sidewall and the second sidewall. The signal port(s) are integrated within the first sidewall and the second sidewall, where each of the signal port(s) are configured to receive a connector of a signal-communication line. The socket(s) are integrated within the rear panel. The circuit board is internally disposed within the housing at least one fastener partially captive within the housing. The mounting-frame assembly is inter-disposed between a wall and the surge-arrestor module and includes the following elements: a wall-mount bracket, mounting hardware, and grounding connector(s). The wall-mount bracket includes a module-mounting portion and a set of mounting holes. The mounting hardware is received by the set of mounting holes. Additionally, the mounting hardware fixedly attaches the wall-mount bracket to a wall. The grounding connectors extend from the module-mounting portion of the wall-mount bracket in generally perpendicular-spaced relation. Additionally, each of the one or more grounding connectors are adapted to insert within each of the socket(s), respectively, thereby frictionally engaging the surge-arrestor module to the wall-mount bracket.

A further aspect of an embodiment takes the form of a surge-protection system for vertically supporting a plurality of surge-arrestor modules above an underlying surface. Initially, the surge-protection system includes, at least, a plurality of surge arrestor modules, signal communication line(s), and a mounting-frame assembly. The plurality of surge-arrestor modules that function to regulate surges between telecommunication devices. Each of the plurality of surge-arrestor modules include the following elements: a housing that includes a first sidewall and a second sidewall that reside in substantially parallel-spaced relation, and a front panel and a rear panel that span between the first sidewall and the second sidewall; signal port(s) integrated within the first sidewall and the second sidewall; socket(s) integrated within the rear panel; and a circuit board internally disposed within the housing. The signal-communication line(s) each include a connector that is engageably coupled to each of the signal port(s) respectively. The mounting-frame assembly is inter-disposed between a wall and each of the plurality of surge-arrestor modules. The mounting-frame assembly includes the following elements: a wall-mount bracket that includes a module-mounting portion and a set of mounting holes; mounting hardware that is received by the set of mounting holes such that the mounting hardware fixedly attaches the wall-mount bracket to a wall; and grounding connector(s) that extend from the module-mounting portion of the wall-mount bracket, in generally perpendicular-spaced relation thereto. Additionally, each of the grounding connector(s) are adapted to insert within each of the one or more sockets respectively thereby vertically supporting each of the plurality of surge-arrestor modules, and supporting the one or more signal-communication lines associated therewith.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
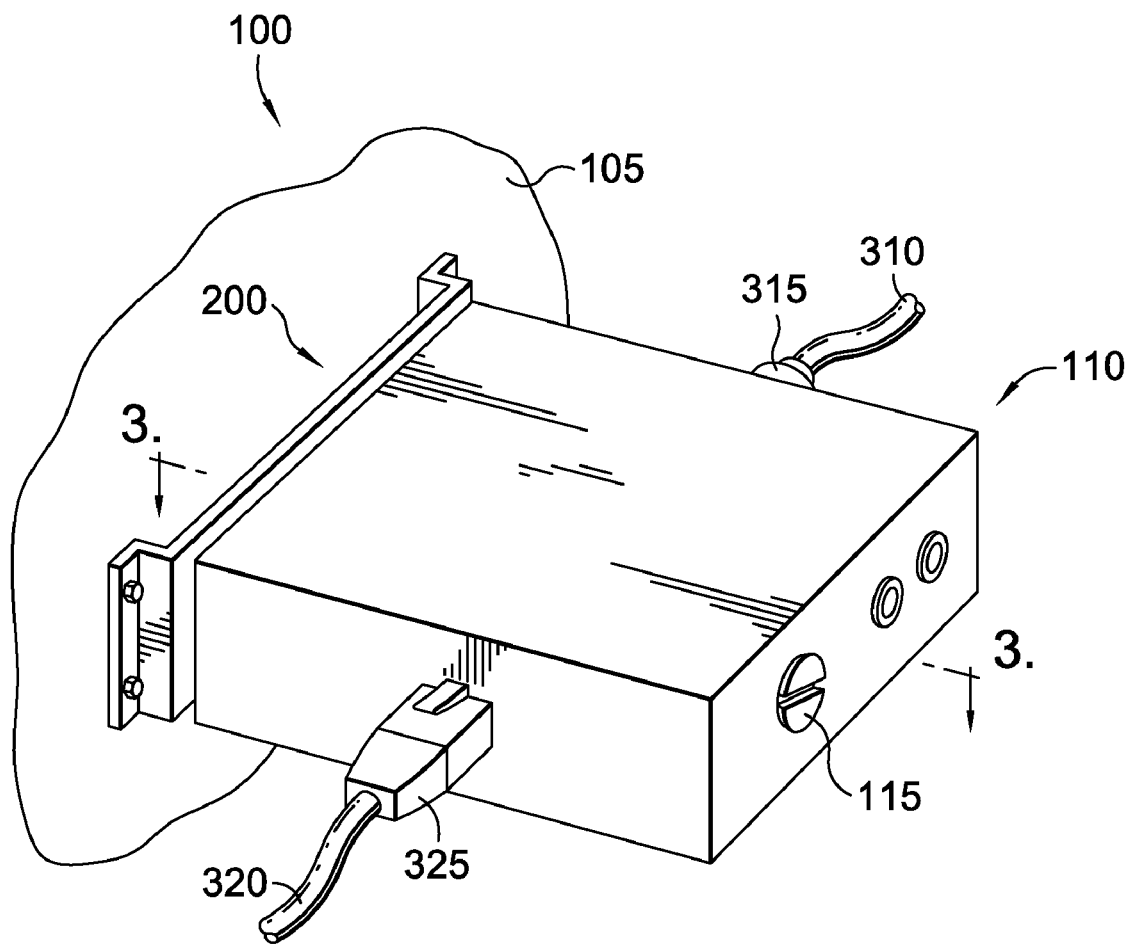
FIG. 1 is a perspective view of an exemplary surge-protection system in an operative configuration suitable for use in implementing embodiments of the present invention.

Embodiments provide a mounting systems and techniques for mounting a radio frequency (RF) surge-arrestor module. Providing a surge-arrestor module to is useful to help safeguard RF signal transmission routes (e.g., digital signal 1 (DS1) circuits, digital signal 3 (DS3) circuits, Ethernet circuits, and the like) from sudden changes in electric flow, or an introduction of an electrical transient. Often a plurality of surge-arrestor modules are employed for protecting systems that have multiple RF signal transmission routes. In order to store the plurality surge-arrestor modules, a mounting system is provided for assembling the plurality of surge-arrestor modules to a wall-mounted bracket in an accessible configuration that occupies a compact space. Advantageously, the wall-mounted bracket provides many benefits that include an increased accessibility for repair and replacement and an improved ability to efficiently diagnose network failures, of each of the plurality of surge-arrestor modules.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| BNC | Bayonet Neill-Concelman |
| DS1 | Digital Signal 1 |
| DS3 | Digital Signal 3 |
| RF | Radio Frequency |
| RJ45 | Register Jack 45 |

Further, various technical terms are used throughout this description. A definition of such terms can be found in Newtons Telecom Dictionary by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate that embodiments may be embodied as, among other things, a radio frequency RF surge-arrestor module. Accordingly, the embodiments may take the form of a hardware embodiment that has a circuitry (i.e., for operating software) that provides a path within RF signal transmission route(s) operable to provide a surge-protection function.

A surge-arrestor module, a surge-arrestor module mounting assembly for vertically supporting a surge-arrestor module, and a surge-protection system for vertically supporting a plurality of surge-arrestor modules above an underlying surface will now be described with reference to the accompanying drawings. The drawings and the associated descriptions are provided to illustrate embodiments of the present invention and not to limit the scope thereof. Reference in the specification to an "embodiment" is intended to indicate that a particular feature, structure, or characteristic described in connection with the embodiment is included in at least an embodiment of the invention. Further, the appearance of the phrase "in one embodiment" in various places in the specification are not necessarily all referring to the same embodiment. Throughout the drawings, reference numerals are re-used to indicate correspondence between referenced elements.

Referring to the drawings in greater detail, and initially to FIG. 1, the embodiments of the present invention are directed toward a surge-protection system, which is shown and designated generally by reference numeral 100. In particular, FIG. 1 is a prospective view of an exemplary surge-protection system 100 in an operative configuration suitable for use in implementing embodiments of the present invention. The surge-protection system 100 broadly includes, a surge-arrestor module (hereinafter the "module") 110, signal-communication lines 310, 320 each of the signal-communication lines include a connector 315, 325 respectively, and a mounting-frame assembly 200 inter-disposed between a wall 105 and the module 110. In one embodiment, a fastener 115 is provided to removably couple the module 110 to the mounting-frame assembly 200. Persons familiar with the field of the invention will realize that fastener 115 may be practiced by various devices which are different from the specific illustrated embodiment. Therefore it is emphasized that the invention is not limited only to its embodiment but is embracing of a wide variety of coupling techniques which fall within the spirit of the following claims. Additional embodiments of coupling techniques are described more fully below with reference to FIG. 2.

Figure 2:
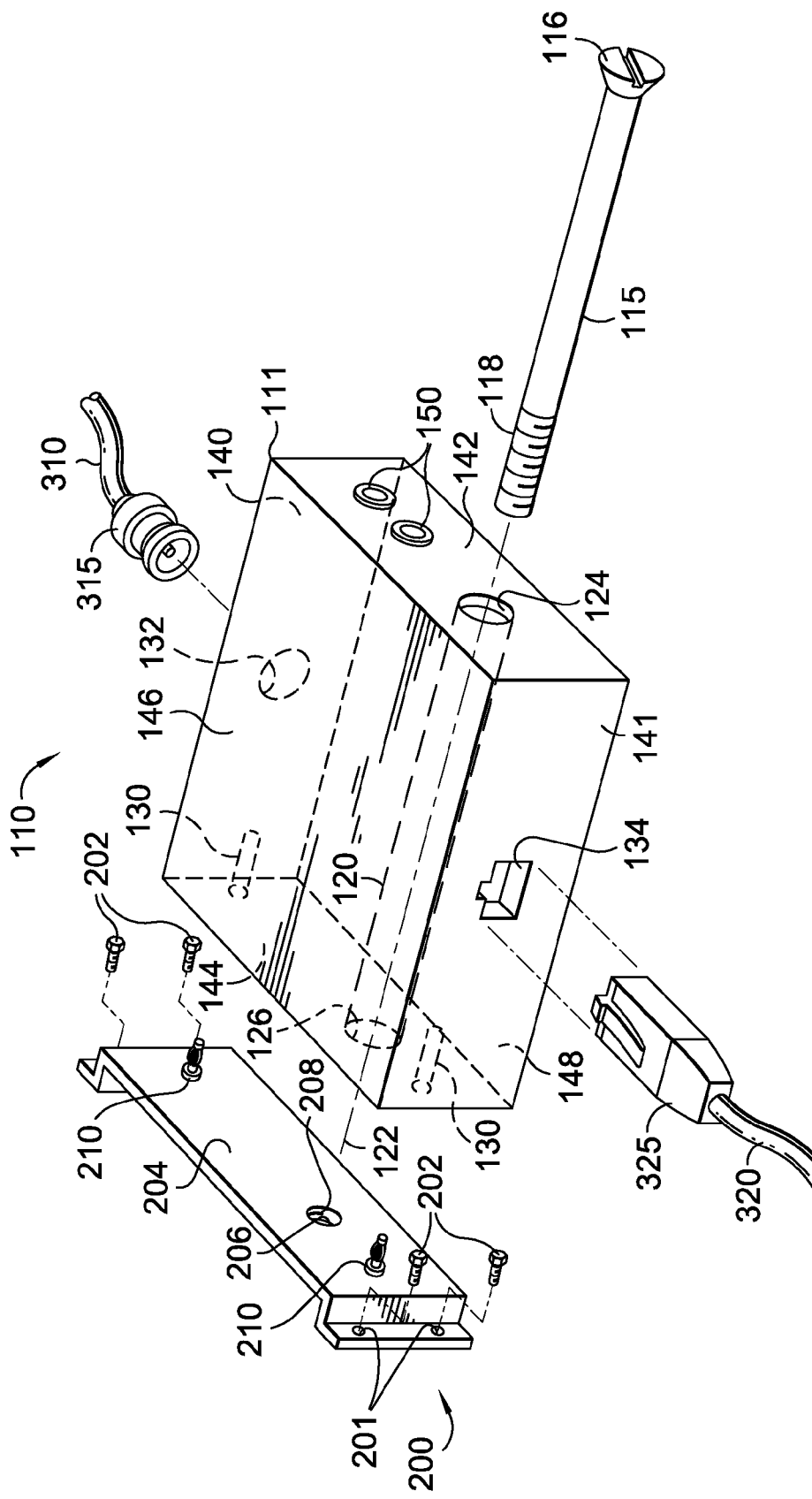
FIG. 2 is a view similar to FIG. 1, but showing the components of the exemplary surge-protection system in an exploded depiction, in accordance with an embodiment.

The components mentioned above will now be discussed with more detail, with reference to FIG. 2. As illustrated, FIG. 2 shows a view similar to FIG. 1, but with the components of the exemplary surge-protection system 100 in an exploded depiction, in accordance with an embodiment. Initially, the module 110 includes the following elements: a housing 111 that has a first sidewall 140 and a second sidewall 141, and a front panel 142 and a rear panel 144; signal input port 132 integrated within the first sidewall 140; signal output port(s) 134 integrated within the second sidewall 141; socket(s) 130 integrated within the rear panel 144; and circuitry (not shown) internally disposed within the housing 111. The circuitry is discussed more fully below with reference to FIG. 3.

In embodiments, the first sidewall 140 and the second sidewall 141 reside in substantially parallel-spaced relation, where the front panel 142 and the rear panel 144 generally span between the first sidewall 140 and the second sidewall 141. In one instance the sidewalls 140, 141, and panels 142, 144, are formed as the sides of the housing 111 that has a parallelogram-shaped profile. In another other instance, the dimensions of the housing 111 are 1 inch×1.25 inches×3 inches. However, it should be understood and appreciated by those of ordinary skill in the art that other housing configurations could be used (e.g., sized to hold circuitry, sized for assembly, sized for circuit connections, etc.) and that the invention is not limited to those embodiments shown and described. In an exemplary embodiment, the housing 111 includes an upper cover 146 and a lower cover 148 disposed between the first sidewall 140 and the second sidewall 141. Additionally, the covers 146, 148, generally span between the front panel 142, and the rear panel 144, such that the circuitry is internally disposed within the housing 111. In the configuration shown in FIG. 2, the covers 146, 148, are formed as generally rectangularly-shaped members. Typically, the panels 142, 144, the sidewalls 140, 141, and the covers 146, 148 are constructed from a generally rigid material, such as metal plating or stamped sheeting and are cut at a generally rectangularly-shaped profile.

The signal input port(s) 132 are typically integrated within the first sidewall 140 and capable of assembling to a connector 315 of a signal-communication line 310 that provides a facility-side signal. Although depicted and described as being integrated within the first side wall 140, the above-illustrated location of the signal input port(s) 132 is an exemplary configuration only; accordingly, any suitable orientation known in the telecommunications industry may be used and is considered by the present invention. For instance, signal input ports(s) 132 may be located on either of the panels 142, 144, the covers, 146, 148, the sidewalls, 140, 141, or an combination thereof. In an exemplary embodiment, the signal input port(s) 132 include an internal adapter operable to transform a facility-side signal from the signal-communication line 310. Advantageously, the signal input port(s) 132 may be formed as a standardized physical interface (e.g., coaxial terminals) to receive any one of a variety of commonly-available connectors. In one embodiment, as illustrated, the signal input port 132 is configured to engageably couple a bayonet Neill-Concelman (BNC)-type connector 315. Accordingly an additional adaptor connector is not required. As such, diagnostic testing is enhanced by reducing the number of separate components to trouble-shoot.

The signal output port(s) 134 are typically integrated within the second sidewall 141 and capable of assembling to a connector 325 of a signal-communication line 320 that provides an equipment-side signal. Although depicted and described as being integrated within the second side wall 141, the above-illustrated location of the signal input port(s) 134 is an exemplary configuration only; accordingly, any suitable orientation known in the telecommunications industry may be used and is considered by the present invention. For instance, signal input ports(s) 134 may be located on either of the panels 142, 144, the covers, 146, 148, the sidewalls, 140, 141, or an combination thereof. In an exemplary embodiment, the signal input port(s) 134 include an internal adapter operable to transform and convey an equipment-side signal from the signal-communication line 320. Advantageously, the signal input port(s) 134 may be formed as a standardized physical interface (e.g., coaxial terminals) to receive any one of a variety of commonly-available connectors. In one embodiment, as illustrated, the signal input port 134 is configured to engageably couple a register jack (RJ)45-type connector 325. Accordingly an additional adaptor connector is not required, as discussed above with reference to the signal output port(s) 132.

Figure 3:
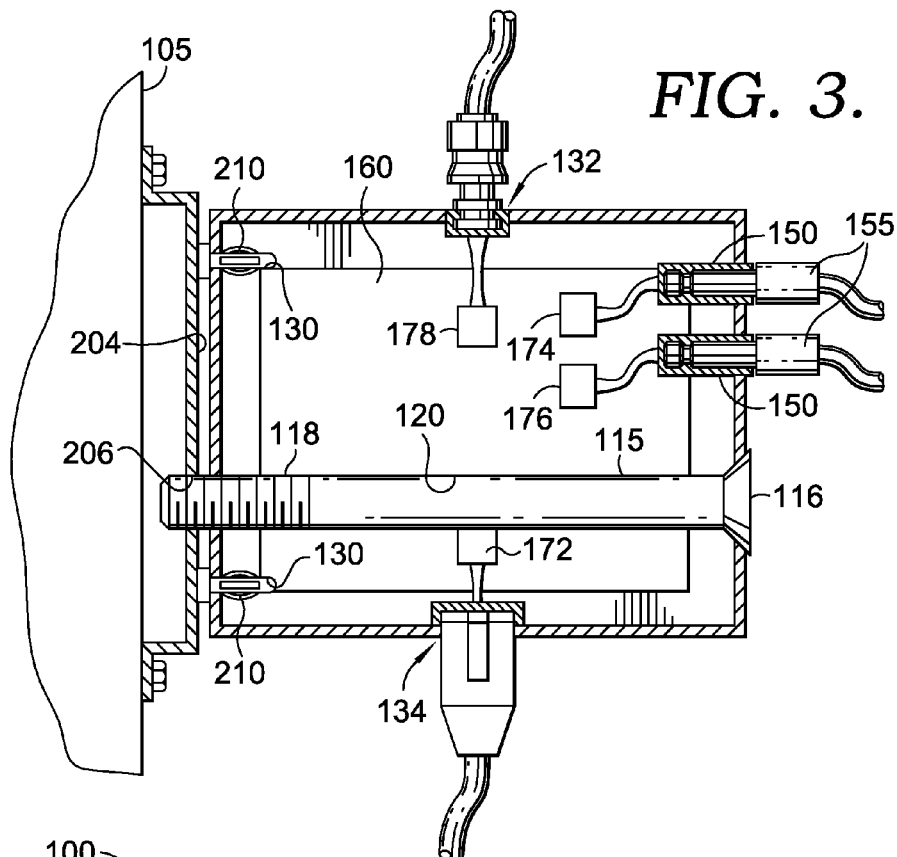
FIG. 3 is a cross sectional top view taken through the housing showing a showing internal structure of a surge-arrestor module, in accordance with an embodiment.

In an exemplary embodiment, the socket(s) 130 are integrated within the rear panel 144 of the housing 111, and each are configured to receive a grounding connector 210 that extends from a wall-mount bracket 204. Typically, the socket(s) 130 are sized to frictionally retain the grounding connector(s) 210 thereby providing physical and electrical coupling of the module 110 and the mounting-frame assembly 200. A cross-sectional view of the physical coupling between the socket(s) 130 and grounding connector(s) is depicted in FIG. 3. The physical coupling provides lateral support of the surge-arrestor module 110 and any additional components attached thereto (e.g., coaxial cable of the signal-communication lines 310, 320). Accordingly, the physical coupling generally allows the module 110 to be engageable and removable with the mounting-frame assembly 200 by a lateral force exerted from the front panel 142 direction. Advantageously, the module 110 is easily accessed and removed to isolate components for diagnosing a circuit. The electrical coupling provides a ground through the wall-mount bracket 204, as discussed more fully below with reference to FIG. 3. Although FIG. 2 illustrates two sockets 130 and two corresponding grounding connectors 210, one of ordinary skill in the art would understand and appreciate that any number of sockets 130 and grounding connectors may be used as dictated by electrical or supportive requirements.

As briefly discussed above, the fastener 115 is provided to removably couple the module 110 to the mounting-frame assembly 200 in vertical suspension and provide rotational stability if a single grounding connector 210 is provided. In an exemplary embodiment, when assembled, the partially captive within the housing 111 comprising a threaded portion 118 configured to threadably engage to the wall-mount bracket 204, and a head portion 116 that is accessible at the front panel of the housing. In one instance, the threadable engagement is made by the threaded portion 118 with internal threading 206 of an aperture 208 disposed on the wall-mount bracket 204. A cross-sectional view of the engagement between the internal threading 206 and threaded portion is depicted in FIG. 3. In another instance, the fastener 115 is partially captive within a fastener-receiving cavity 120 of the housing 111. The fastener-receiving cavity 120 is accessible by forward-facing aperture(s) 124 disposed on the front panel 142 and rearward-facing aperture(s) 126 disposed on the rear panel 144. In one embodiment, each of the forward-facing aperture(s) 124 corresponds with each of the rearward-facing aperture(s) 126 respectively thereby defining the ends of each of the fastener-receiving cavities 120. During assembly, the fastener 115 is laterally aligned with the fastener-receiving cavity 120, and is partially disposed therein. In one instance, the fastener-receiving cavity 120 defines a centrally-disposed axis 122 that is generally orientated in perpendicular-spaced relation to the rear panel 144. Accordingly, this configuration assists the initial engagement between the internal threading 206 and the threaded portion 118.

As depicted in FIG. 3, a cross-sectional view of the fastener 115 retaining the module 110 against the mounting-frame assembly 200 is depicted. In this assembled condition, the head portion 116 of the fastener 115 is seated on the front panel 142 of the housing 111. In one embodiment, the head portion 116 is configured to receive a user-operated tool rotatably adjust the fastener 115. Accordingly, the rotatably adjustment affects the removable coupling of the module 110 to the wall-mount bracket 204. In another the head portion 116 is configured as a thumb-screw (e.g., knurling on a exposed portion) that allows for manually assembling and removing the module 110. In one embodiment, similar to the grounding connector(s) 210, the fastener 115 may provide an electrical coupling whereby the circuitry is grounded through the fastener 115 to the mounting-frame assembly 200. Although depicted as a single fastener, the scope of the present invention contemplates one or more fasteners 115, a variety of industry-standard fasteners, or no fasteners. In the embodiment with no fasteners, the grounding connector(s) 210 are relied upon to laterally frictionally secure, in addition to providing vertical support to, the module 110.

Returning to FIG. 2, one or more monitor jacks 150 may be provided for diagnostically monitoring the RF signal transmission routes. Typically, one or more monitor jacks 150 are disposed on the front panel 142, opposed the wall 105, such that they are easily accessible for testing and/or monitoring purposes; however, the scope of the invention is not limited to location on a particular panel, sidewall, cover, or any combination thereof. As depicted in FIG. 3, a cross-sectional view of one or more monitor jacks 150 is shown. In this embodiment, the monitor jacks 150 are operably connected to the communicative signal path provided by the circuitry at connections 174 and 176. Typically, connections 174 and 176 are access points in the circuitry that may be read without interrupting the RF transmission. The cross-sectional view further depicts connectors 155 inserted into the monitor jacks 150 in a diagnostic configuration for monitoring, testing, rerouting, etc., communications within circuit paths to observe and analyze signal conditions.

The mounting-frame assembly 200 is inter-disposed between a wall 105 and the module 110, and typically serves as a grounding device for the circuitry. The mounting-frame assembly typically includes the wall-mount bracket 204, the grounding connector(s) 210, the aperture(s) 208 (discussed above), and mounting hardware 202 that is received by at least one set of mounting holes 201. Accordingly, the mounting hardware 202 fixedly attaches the wall-mount bracket 204 to the wall 105. In other embodiment, the fixed attachment is made by mounting hardware such as hex-bolts, hex-nuts, or any other suitable fasteners which are well known in the telecommunications industry.

In embodiments, the wall-mount bracket 204 is manufactured from a generally rigid material. Preferably, the material is an electrically conductive material that transmits a surge and/or electrical transient from the circuitry in the module 110, through the ground connector(s) 210, to a grounding source (not shown) with minimal resistance. Accordingly, the ground connector(s) 210 are composed of a conductive material, such as nickel-plated brass or any other suitable metal. In one embodiment, the grounding connector(s) 210 extend in a generally perpendicular-spaced relation to the wall-mount bracket, thereby facilitating vertical support and user-removal of the module 110. In another embodiment, the grounding connector(s) 210 are banana plugs that have a body with a spring. It should be understood and appreciated that any style of connectors that are adapted to be inserted within each of the one or more sockets respectively, thereby frictionally engaging the module 110 to the wall-mount bracket 204 in physical and electrical engagement, is contemplated by the present invention. Advantageously, the need for separate lines and connections for provide a grounding circuit is obviated.

Referring now to FIG. 3, a cross-sectional top view showing a showing internal structure of the module 110 is illustrated, in accordance with an embodiment. Initially, the circuitry (not shown) is internally disposed within the housing 111 and functions to regulate surges and/or electrical transients while allowing RF signals to pass through generally uninterrupted between the signal-communication lines 310, 320. In one embodiment, the circuitry is embodied on a circuit board 160. Accordingly, in this embodiment, the circuit board 160 provides a communicative signal path between connection 178 of the signal input port(s) 132, and connection 172 of the signal output port(s) 134. Additionally, as described above, the circuit board is configured to intermittently connect the communicative signal path to the socket(s) 130 for purposes of grounding.

Figure 4:
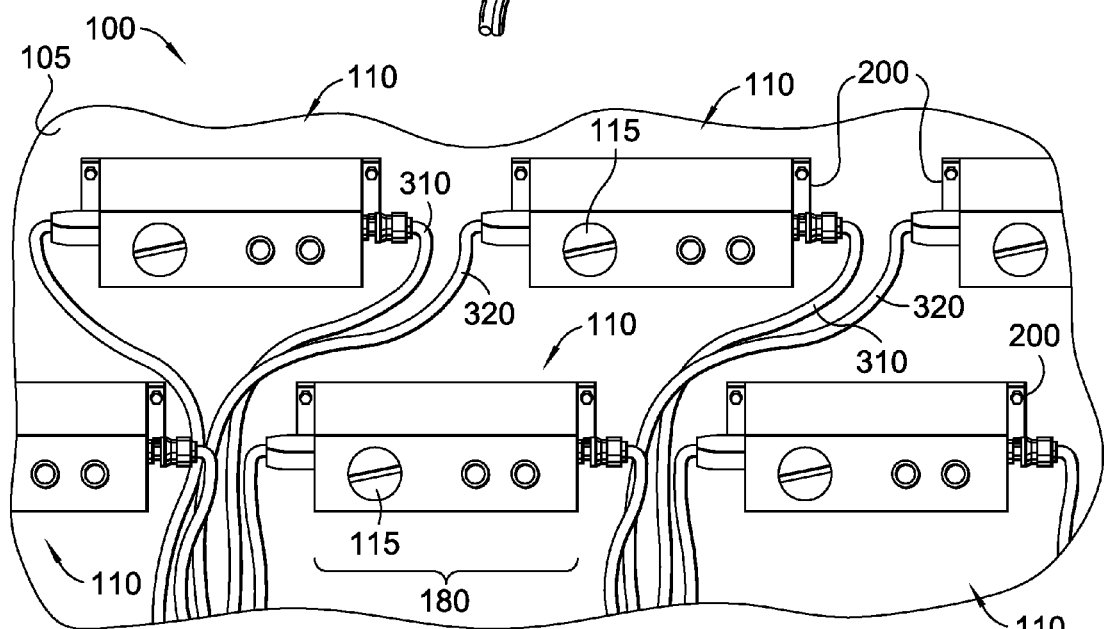
FIG. 4 is a prospective view of a surge-protection system that includes a plurality of module mounting assemblies showing a method for arranging modules and dressing signal-communication lines, in accordance with an embodiment.

Turning now to FIG. 4, a prospective view of a surge-protection system 100 that includes a plurality of module mounting assemblies 180 showing a method for arranging modules 110 and dressing the signal-communication lines 310, 320, in accordance with an embodiment of the present invention. The signal-communication lines 310, 320 are engageably coupled to each of the modules 110, as described above, and may be formed from any suitable wiring that carries RF signals. Preferably, the signal-communication lines 310, 320 are formed from coaxial cables that allow of the signal-communication lines 310, 320 to be positioned, or dressed, between the other adjacent modules 110. In one embodiment, the mounting-frame assemblies 200 are spaced to facilitate dressing the signal-communication lines 310, 320. In another embodiment, mounting-frame assemblies 200 are configured as a single assembly that is inter-disposed between the wall and a plurality of modules 100. Advantageously, the embodiments described above provide easy user access to the signal-communication lines 310, 320, to the fastener(s) 115, and to each module 110 individually thereby facilitating diagnosis of individual elements within the RF signal transmission route(s).

Although the single configuration of the surge-protection system 100 is depicted in FIG. 4, various other positioning schemes are contemplated, and the description above is not intended to limit the scope of use, or the functionality, of the invention. Neither should the invention be interpreted as having a dependency or requirement relating to one, or a combination, of structures discussed in the exemplary embodiments above. Further, these structures may be also be variant between other components operably coupled to other RF transmission routes.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims.

The invention claimed is:

1. A surge-arrestor module comprising:
 a housing that comprises a first sidewall and a second sidewall that reside in substantially parallel-spaced relation, and a front panel and a rear panel, wherein the front panel and the rear panel span between the first sidewall and the second sidewall;
 one or more signal input ports integrated within the first sidewall that are configured to receive a connector of at least one first signal-communication line;
 one or more signal output ports integrated within the second sidewall that are configured to receive a connector of at least one second signal-communication line;

one or more sockets integrated within the rear panel of the surge-arrestor module, each of the one or more sockets being configured to receive a respective grounding connector that extends from a wall-mount bracket, wherein the one or more sockets are configured to frictionally retain the respective grounding connector therein and to provide physical and electrical coupling of the surge-arrestor module to the wall-mount bracket;

circuitry internally disposed within the housing for providing a communicative signal path between the one or more signal input ports and the one or more signal output ports, wherein the circuitry is configured to intermittently connect the communicative signal path to the electrical coupling of the of the one or more sockets with the respective grounding connector; and at least one fastener partially captive within the housing, wherein the at least one fastener, in cooperation with the physical coupling of the one or more sockets with the respective grounding connector, securably coupling the surge-arrestor module to the wall-mount bracket.

2. The surge-arrestor module of claim 1, wherein the at least one fastener removably couples the surge arrestor module to a mounting bracket in vertical suspension.

3. The surge-arrestor module of claim 1, wherein the housing further comprises an upper cover and a lower cover configured as generally rectangularly-shaped members and spanning between the first sidewall and the second sidewall.

4. The surge-arrestor module of claim 1, wherein the one or more signal input ports comprise an internal adapter configured to receive a facility-side signal from the at least one first signal-communication line, wherein the one or more signal output ports comprise an internal adapter to convey an equipment-side signal to the least one second signal-communication line.

5. The surge-arrestor module of claim 1, wherein the one or more signal input ports and the one more signal output ports are configured to engageably couple a register jack (RJ)45-type connector.

6. The surge-arrestor module of claim 1, wherein the one or more signal input ports and the one more signal output ports are configured to engageably couple a bayonet Neill-Concelman (BNC)-type connector.

7. The surge-arrestor module of claim 1, wherein each of the one or more sockets integrated within the rear panel are sized to frictionally retain the respective grounding connector to provide lateral support of the surge-arrestor module.

8. The surge-arrestor module of claim 1, wherein the at least one fastener is partially captive within the housing comprising a threaded portion configured to threadably engage to the wall-mount bracket, and a head portion that is accessible at the front panel of the housing.

9. The surge-arrestor module of claim 1, wherein the housing further comprises one or more forward-facing apertures disposed on the front panel and one or more rearward-facing apertures disposed on the rear panel, wherein each of the one or more forward-facing apertures corresponds with each of the one or more rearward-facing apertures respectively to define one or more fastener-receiving cavities.

10. The surge-arrestor module of claim 9, wherein each of the at least one fasteners are laterally aligned with each of the one or more fastener-receiving cavities respectively and partially disposed therein.

11. The surge-arrestor module of claim 10, wherein each of the one or more fastener-receiving cavities defines a centrally-disposed axis that is generally orientated in perpendicular-spaced relation to the rear panel.

12. The surge-arrestor module of claim 8, wherein the head portion of the at least one fastener is configured to receive a user-operated tool to rotatably adjust the at least one fastener, such that the rotatable adjustment affects the removable coupling of the surge-arrestor module to the wall-mount bracket.

13. The surge-arrestor module of claim 8, wherein the housing further comprises monitor jacks disposed on the front panel, the monitor jacks are operably connected to the communicative signal path provided by the circuitry.

14. A surge-arrestor module mounting assembly for vertically supporting a surge-arrestor module, the assembly comprising:

the surge-arrestor module comprising:
a housing that comprises a first sidewall and a second sidewall that reside in substantially parallel-spaced relation, and a front panel and a rear panel, wherein the front panel and the rear panel span between the first sidewall and the second sidewall;

one or more signal ports integrated within the first sidewall and the second sidewall, wherein each of the one or more signal ports are configured to receive a connector of a signal-communication line;

one or more sockets integrated within the rear panel; and a circuit board internally disposed within the housing, wherein the circuit board comprises circuitry for providing a communicative signal path between the one or more signal ports of the first sidewall and the one or more signal ports of the second sidewall, and wherein the circuitry is adapted to intermittently connect the communicative signal path to the one or more sockets; and a mounting-frame assembly configured for being interdisposed between a wall and the surge-arrestor module, the mounting-frame assembly comprising:

a wall-mount bracket that includes a module-mounting portion and a set of mounting holes;

mounting hardware that is received by the set of mounting holes, wherein the mounting hardware fixedly attaches the wall-mount bracket to the wall; and one or more grounding connectors that extend from the module-mounting portion of the wall-mount bracket, in generally perpendicular-spaced relation thereto, wherein each of the one or more grounding connectors are adapted to be inserted within each of the one or more sockets respectively thereby frictionally engaging the surge-arrestor module to the wall-mount bracket, wherein, when frictionally engaged with the one or more sockets integrated within the rear panel, the one or more grounding connectors are sized to support the surge-arrestor module in vertical suspension and provide lateral and rotational stability thereof.

15. The assembly of claim 14, wherein the mounting-frame assembly is comprised of an electrically-conductive material to produce a grounding effect incident to the circuitry intermittently connecting the communicative signal path to the one or more sockets.

16. The assembly of claim 14, wherein the surge-arrestor module further comprising one or more fastener-receiving cavities defining a centrally-disposed axis orientated in substantial parallel-spaced relation with the module-mounting portion of the wall-mounting bracket, wherein the one or more fastener-receiving cavities are adapted to receive a fastener therein, wherein each fastener is laterally aligned with the centrally disposed axis of each of the one or more fastener-receiving cavities respectively, wherein each fastener securably coupling the surge-arrestor module to the wall-mount bracket.

17. A surge-protection system for vertically supporting a plurality of surge-arrestor modules above an underlying surface, the system comprising:
   the plurality of surge-arrestor modules that function to regulate surges between telecommunication devices, each of the plurality of surge-arrestor modules comprising:
      a housing that comprises a first sidewall and a second sidewall that reside in substantially parallel-spaced relation, and a front panel and a rear panel, wherein the front panel and the rear panel span between the first sidewall and the second sidewall;
      one or more signal ports integrated within the first sidewall and the second sidewall;
      one or more sockets integrated within the rear panel; and
      a circuit board internally disposed within the housing, wherein the circuit board comprises circuitry for providing a communicative signal path between the one or more signal ports of the first sidewall and the one or more signal ports of the second sidewall, and wherein the circuitry is adapted to intermittently connect the communicative signal path to the one or more sockets;
   one or more signal-communication lines, each of the one or more signal-communication lines comprising a connector that is engageably coupled to each of the one or more signal ports respectively; and
   a mounting-frame assembly configured for being interdisposed between a wall and each of the plurality of surge-arrestor modules, the mounting-frame assembly comprising:
      a wall-mount bracket that includes a module-mounting portion and a set of mounting holes;
      mounting hardware that is received by the set of mounting holes, wherein the mounting hardware fixedly attaches the wall-mount bracket to a wall; and
      one or more grounding connectors that extend from the module-mounting portion of the wall-mount bracket, in generally perpendicular-spaced relation thereto, wherein each of the one or more grounding connectors are adapted to insert within each of the one or more sockets respectively holding each of the plurality of surge-arrestor modules in frictional engagement to the wall-mount bracket, thereby vertically supporting each of the plurality of surge-arrestor modules, and the one or more signal-communication lines associated therewith.

18. The surge-protection system of claim 17, further comprising a plurality of fasteners for securably coupling the plurality of surge-arrestor modules to the wall-mount bracket, wherein each of the plurality of fasteners is partially captive within the housing of each of the plurality of surge-arrestor modules respectively, each of the plurality of fasteners comprising a threaded portion configured to threadably engage to the wall-mount bracket and a head portion that is seated at the front panel of the housing of each of the plurality of surge-arrestor modules respectively.

* * * * *